US012630065B2

(12) United States Patent
Himmelhuber et al.

(10) Patent No.: US 12,630,065 B2
(45) Date of Patent: May 19, 2026

(54) VEHICLE EQUIPMENT DEVICE

(71) Applicant: GRAMMER AG, Ursensollen (DE)

(72) Inventors: Erwin Himmelhuber,
Sulzbach-Rosenberg (DE); Werner Stöcker, Hochstadt (DE)

(73) Assignee: GRAMMER AG, Ursensollen (DE)

( * ) Notice: Subject to any disclaimer, the term of this patent is extended or adjusted under 35 U.S.C. 154(b) by 186 days.

(21) Appl. No.: 18/517,479

(22) Filed: Nov. 22, 2023

(65) Prior Publication Data

US 2024/0174153 A1 May 30, 2024

(30) Foreign Application Priority Data

Nov. 25, 2022 (DE) ..................... 10 2022 131 268.2

(51) Int. Cl.
B60N 2/90 (2018.01)
B60N 2/75 (2018.01)

(52) U.S. Cl.
CPC ............. B60N 2/933 (2018.02); B60N 2/767 (2018.02)

(58) Field of Classification Search
CPC .......... B60N 2/90; B60N 2/919; B60N 2/933; B60N 2002/948; B60N 2/763; B60N 2/767; B60N 2/777
See application file for complete search history.

(56) References Cited

U.S. PATENT DOCUMENTS

| | | | | |
|---|---|---|---|---|
| 5,058,240 A | * | 10/1991 | Barda ..................... | B60N 2/433 297/398 |
| 6,481,799 B1 | * | 11/2002 | Whalen ..................... | B60N 2/20 297/378.11 |
| 7,780,234 B2 | * | 8/2010 | Grable ................... | B60N 2/305 297/331 |
| 8,752,898 B2 | * | 6/2014 | Gleason ................. | B60N 2/433 297/354.12 |
| 9,352,672 B2 | * | 5/2016 | Elton ........................ | B60N 2/43 |
| 9,376,078 B1 | * | 6/2016 | Li ........................... | B60N 2/433 |
| 9,751,436 B2 | | 9/2017 | Hessdörfer | |
| 10,315,540 B2 | * | 6/2019 | Caye ..................... | B60N 2/433 |

(Continued)

FOREIGN PATENT DOCUMENTS

DE 102014111923 A1 2/2016

*Primary Examiner* — Chi Q Nguyen
(74) *Attorney, Agent, or Firm* — LUCAS & MERCANTI, LLP; Klaus P. Stoffel

(57) ABSTRACT

An equipment device for the interior of a vehicle, having a pivot part mounted on a base to be pivotable between a first position and a second position and can be locked in a pivot position by a locking device. The locking device has a first stop associated with the pivot part, which stop, in a latching position, is engaged with a second stop associated with the base and is disengaged in a release position. The first or the second stop is associated with a movable latch, having a safety device that prevents the locking device from moving into the release position with a vehicle acceleration. The safety device includes a blocking device having an inertia element pivotable about a pivot axis and connected in terms of movement to a wall having a blocking surface. In a rest position of the blocking device, the latch is movable into the release position and, in a blocking position, movement of the latch is prevented by collision of the latch with the blocking surface. The blocking surface extends over a pivot angle of 270°-360°.

17 Claims, 11 Drawing Sheets

(56) References Cited

U.S. PATENT DOCUMENTS

2018/0154804  A1*   6/2018   Caye ................... B60N 2/4221
2024/0035308  A1*   2/2024   Hiratsuka ............. B60N 2/366
2024/0262259  A1*   8/2024   Schutzman ........ B60N 2/01541

* cited by examiner

VEHICLE EQUIPMENT DEVICE

CROSS-REFERENCE TO RELATED APPLICATIONS

The present application claims priority of DE 10 2022 131 268.2, filed Nov. 25, 2022, the priority of this application is hereby claimed and this application is incorporated herein by reference.

BACKGROUND OF THE INVENTION

The invention relates to a vehicle equipment device for the interior of a vehicle. Within the meaning of the invention, a vehicle can be a land vehicle, an aircraft or a water-craft.

An armrest is an example of such an equipment device for the vehicle interior. The armrest comprises a base and an arm support which is pivotably mounted on the base. The arm support can be locked in multiple use and optionally out-of-use positions by means of a locking device, so that a pivot movement of the arm support is blocked in at least one direction. For adjusting the arm support, the locking device can be moved between a latching position and a release position.

The armrest has a safety device. In the event of strong acceleration or deceleration or in the event of a rollover, such safety devices prevent the locking device from accidentally moving into the release position and the armrest, which moves as a result, from injuring an occupant of the vehicle. Movement into the release position is prevented, for example, by the safety device being moved into a blocking position by means of an inertia element.

Such an equipment device is known from DE 10 2014 111 923 A1. That specification describes an armrest having a console part and a pivotable arm support which is movable between a bottom use position and a top rest position. Latching teeth are fixedly arranged on the armrest, and a latching engagement member is held in a movable manner on the console part. The latching engagement member is able to engage into the latching teeth in at least one position of the armrest. An inertia element prevents the latching engagement member from being unlatched in a blocking position and allows it to be unlatched in a release position. The inertia element, starting from the release position, has regions in respect of both pivot directions in which unlatching is blocked.

SUMMARY OF THE INVENTION

The object of the invention was to provide an equipment device which offers greater safety for the user.

The object has been achieved by an equipment device having the features of claim 1.

The equipment device is intended for the interior of a vehicle. It can be, for example, an armrest or the cover of a center console having an armrest function. The equipment device comprises a pivot part which is pivotably mounted on a base and is pivotable relative to the base between a first position and a second position. In at least one pivot position, the arm support can be locked by means of a locking device. The locking device has first stop means associated with the pivot part, said stop means cooperating with second stop means associated with the base and being in engagement with one another in a latching position and out of engagement in a release position.

A safety device is provided in order to allow the movement of the locking device into the release position to be prevented in the event of an acceleration or deceleration of the vehicle. The safety device comprises a blocking device having an inertia element which is pivotable about a pivot axis. The inertia element is connected in terms of movement to a blocking element having a blocking surface and an opening. In a rest position, the blocking element is arranged in such a manner that an engagement means of a latch comprising the second stop means is able to move into the opening, and in a blocking position it prevents the latch from moving by virtue of a collision of the engagement means with the blocking surface.

The blocking surface extends, in respect of at least one pivot direction, over an angle range of between 270° and 360°. The latch is able to move into the release position in only one angular position, the rest position of the blocking device. The inertia element and the wall are rotatable, for example, over an angle range of 360°.

An advantage of the armrest according to the invention is that, even in the case of strong positive or negative acceleration, such as in an accident situation, for example, a state cannot occur in which the locking device is movable into the release position. According to the invention, the blocking element does not block only in the region of the opening. The armrest therefore offers improved safety in relation to the prior art.

The latch has, for example, an engagement means and the wall has an opening. In the rest position, the engagement means is located opposite the opening and the engagement means is able to move into the opening, while the latch moves into the release position. In the blocking position, the engagement means and the blocking surface of the wall collide, so that a movement of the latch into the release position is prevented due to the absence of a degree of freedom. The latch is then captive in the latching position and the pivot part is unable to move out of the pivot position which has been established.

The latch is movable, for example, in a pivotable or translational manner between the latching position and the release position. The latch can, for example, be mounted on the pivot part or on the base so as to be pivotable about a pivot axis. In this case, the latch forms a catch which has the first stop means or the second stop means. The respective other stop means are fixedly arranged on the base or on the pivot part.

According to an alternative, translational mounting of the latch on the pivot part or on the base is possible, in such a manner that the latch is able to move between the latching position and the release position. The translational movement can be linear or along a curved path.

In principle, it is possible that the latch has the second stop means and is associated with the base, wherein the first stop means are fixedly held on the pivot part, or that the latch has the first stop means and is associated with the pivot part, wherein the second stop means are fixedly held on the base. In both variants, the latch is movable between the latching position, in which the first stop means and the second stop means are in engagement, and a release position, in which the first stop means and the second stop means are out of engagement.

For example, the first stop means are formed on at least one arm of the pivot part which comprises a part-region of the pivot part and forms part of the pivotal articulation. The arm has the shape of a segment of a circle, for example, so that it moves on a circular path during the pivoting movement of the pivot part. In this way, the exit aperture of the arm from the base can be kept small, which is advantageous from the visual point of view. In addition, the movement of the arm on a circular path has structural advantages in terms of locking.

The locking device is configured, for example, in such a manner that the pivot part is able to be locked in at least two positions. In particular, the pivot part can be able to be locked in a plurality of positions, for example in from 5 to 15 positions.

The opening extends, for example, radially from a face of the wall in the direction of the pivot axis. Alternatively, the opening can be configured in a different way, in such a manner that the engagement means, as it moves on the movement path of the latch, is able to move into engagement with the opening, while the latch moves into the release position. The pivot axis is, for example, a pivot axis common to the inertia element and the wall.

For example, the movement connection between the inertia element and the wall can be established in that the inertia element is formed in one piece with the wall. This embodiment facilitates production. Alternatively, the inertia element and the wall can also be separate parts which are mounted in a rotationally fixed manner on a pivot axis.

The inertia element is configured, for example, as a one-armed lever. There is a material accumulation, for example, at an end region of the inertia element, for example at an end region of an inertia element configured as an arm, and said material accumulation generates a torque in the event of a positive or negative acceleration. The inertia element is arranged, for example, in such a manner that it loads the blocking device into the rest position.

The wall is formed, for example, by at least one circular disc or at least one circular ring. The circular disc or the circular ring is mounted, for example, in such a manner that it is able rotate about the center of the circle. The rotational axis runs, for example, transverse to a plane formed by the circular disc or the circular ring. The blocking device can then be configured in a space-saving manner. At least two circular discs or circular rings can be formed at an angle to one another. According to an alternative, the wall can be in the form of a sphere and the blocking surface is formed by the surface of the sphere.

The blocking surface is situated, for example, on a face of the at least one wall configured as a circular disc or circular ring. The face is, for example, interrupted in a region in which the opening is formed. Alternatively, the blocking surface is situated on the face of the ring or on the outer surface of the sphere.

The latch is movable between the latching position and the release position, for example, manually by means of an actuating device or by means of a controller. In the case of a manual adjustment of the latch, an actuator is moved by the user. In the case where a controller is provided, the pivot part can be moved in a first movement direction, for example, while a movement in a second movement direction is not possible. If the pivot part is moved into a first reversal position, the controller switches the latch into the release position, so that a movement in the second movement direction is possible. Movement of the pivot part into a second reversal position results in the controller moving the latch into the latching position again.

The blocking device is loaded into the rest position by the weight of the inertia element, for example. In addition or alternatively, at least one return element loads the blocking device into the rest position. The return element is, for example, a spring or a resilient foam.

The inertia element is, for example, mounted so as to be pivotable about at least one pivot axis. Two pivot axes can form a right angle relative to one another, for example. Alternatively, the inertia element is mounted by a ball joint. It is then able to pivot in all directions about the pivot center.

An accidental movement of the blocking device from the blocking position back into the rest position can, for example, be delayed by means of delay means or prevented by means of retaining means. It is then not possible that—for example by virtue of reciprocal forces—the blocking device is moved back into the rest position so that the locking device is able to move into the release position.

The equipment device is, for example, an armrest, wherein the pivot part is formed by an arm support which is pivotable relative to a base. The arm support can also be formed by the pivotable cover of a center console, which is pivotable relative to a base fixed to the bodywork and in which a storage compartment, for example, is formed.

Exemplary embodiments of the invention are described by way of example in the following description of the figures, also with reference to the drawings. In the drawings, for the sake of clarity—also where different exemplary embodiments are concerned—identical or comparable parts or elements or regions are designated with identical reference signs, in some cases with the addition of lowercase letters.

Features which are described only in relation to one exemplary embodiment can also be provided within the scope of the invention in any other exemplary embodiment of the invention. Such modified exemplary embodiments—even if they are not shown in the drawings—are included in the invention.

All the disclosed features are in themselves essential to the invention. The disclosed content of the cited publications and of the described devices of the prior art is hereby also incorporated in its entirety into the disclosure of the application, also for the purpose of incorporating individual or multiple features of these documents into one or into multiple claims of the present application.

DETAILED DESCRIPTION OF THE INVENTION

Figure 1A:
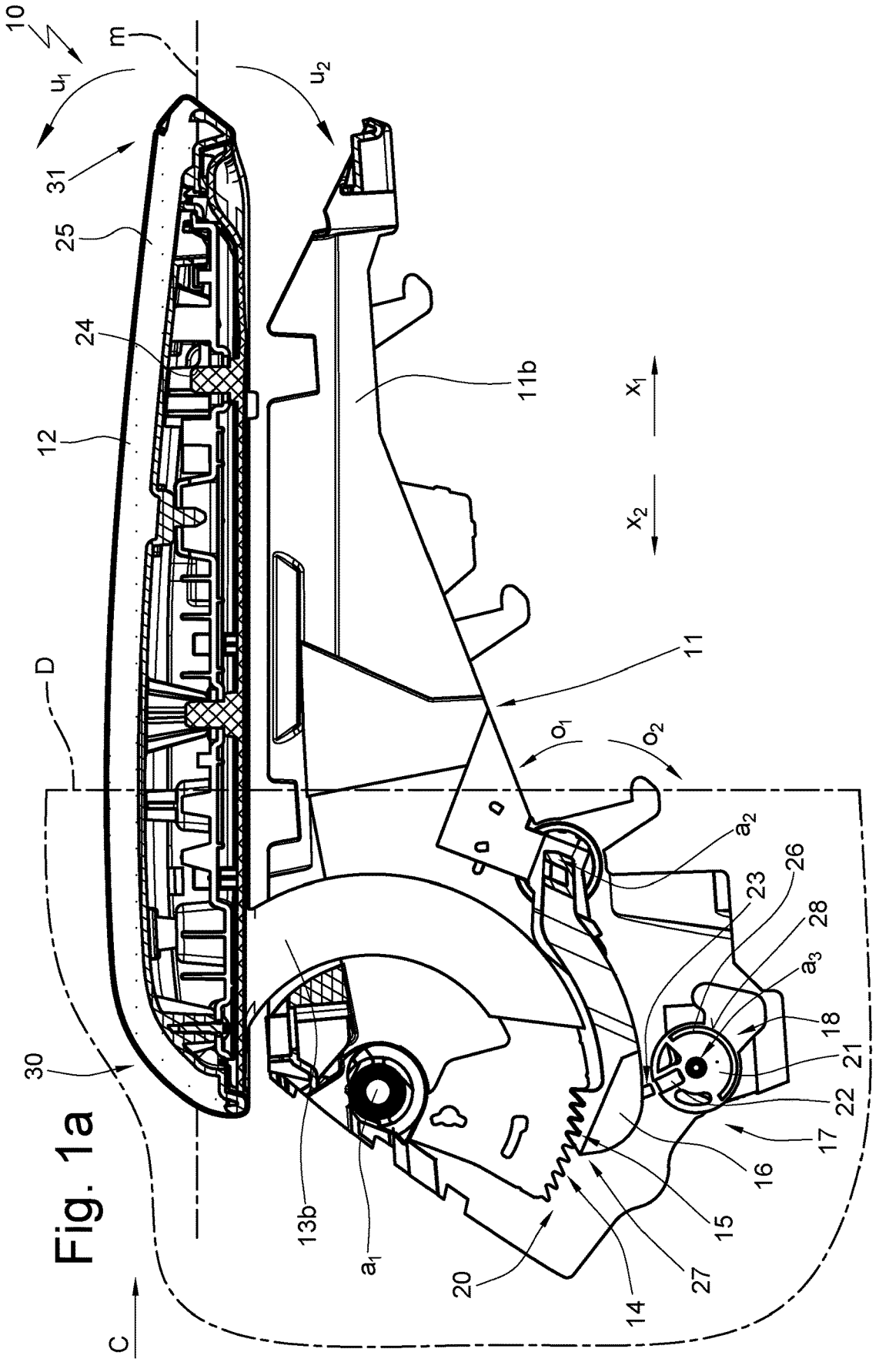
FIG. 1a is a sectional view of an equipment device in the form of an armrest according to section line A-A in FIG. 2.

The equipment device as a whole is designated by reference sign 10 in the figures. In this exemplary embodiment, the equipment device 10 is configured in the form of an armrest. It comprises a base 11 (see e.g. FIG. 1*a*), which here has two side plates 11*a* and 11*b* which are connected together. A pivot part 12 is mounted on the base 11 so as to be pivotable about a pivot axis a1 in directions u1 and u2. The pivot part 12 has an end region 30 on the articulated side and a free end region 31.

In the present example, the equipment device 10 is arranged, for example, in such a manner that, in a use position shown in FIG. 1*a*, a longitudinal center axis m of the pivot part 12 is parallel to directions of travel x1 and x2. The pivot part 12 comprises, for example, a support structure 24 and a pad 25. The pivot part 12 additionally has arms 13*a* and 13*b* by which it is mounted on the base 11.

The pivot part 12 is movable between the first position shown in FIG. 1 and a second position (not shown). In this exemplary embodiment, the pivot part 12 in the second position is arranged in such a manner that the longitudinal center axis m of the pivot part 12 is oriented approximately vertically.

The equipment device 10 comprises a locking device 20 for locking the pivot part 10 in multiple different positions. The locking device 20 is adjustable between a latching position and a release position. In the latching position, a movement of the pivot part 12 is not possible in at least one direction. In this example, the pivot part 12 is not movable in either direction u1 or u2 in the latching position. Alternatively, the locking device 20 could be configured as a directional locking mechanism, such that in the latching position the pivot part 12 is freely movable in a first direction, for example in direction u1, a movement in a second direction, for example in direction u2, is freely movable.

The locking device 20 comprises first stop means 14, which are associated with the pivot part 12, and second stop means 15, which are associated with the base 11. In the present example, the stop means 14, 15 are configured as cooperating teeth.

In this example, the first stop means 14 are fixedly located on the arms 13*a*, 13*b*. That is to say, the first stop means 14 are immovably formed on the arms 13*a* and 13*b*. The second stop means 15 are formed on a latch 16, which is mounted on the base 11 so as to be pivotable about a pivot axis a2 in directions o1 and o2.

In the present exemplary embodiment, the second stop means 15 are arranged at an end region 27 of the latch 16. In the latching position, the latch 16 has been moved in such a manner that the second stop means 15 are in engagement with the first stop means 14. In the release position, the latch is positioned in such a manner that the stop means 14 and 15 are out of engagement.

According to an alternative embodiment (not shown), at least one latch 16 could also be held on one of the arms 13*a* and 13*b*, and the second stop means 15 could be fixedly arranged on the base 11. It would be advantageous for better force distribution in this case if a latch 16 were held on each of the arms 13*a* and 13*b*, said latch cooperating in each case with stop means arranged on the base 11.

The armrest 10 comprises a safety device 17. The purpose of the safety device 17 is to prevent the locking device 20 from accidentally moving into the release position in the case of a positive or negative minimum acceleration of the vehicle. The safety device 17 comprises an engagement means 23 (in this example in the form of a prolongation) on the latch 16, and a blocking device 18.

The blocking device 18 is provided with an inertia element 19 and a wall 21 which has an opening 22 and a blocking surface 28 and which is connected in terms of movement to the inertia element 19. The wall is formed, for example, by at least one circular disc or circular ring or is configured as a sphere. In the present example, the wall is in the form of a circular disc. The inertia element 19 and the wall 21 are mounted so as to be pivotable about a pivot axis a3 in directions p1 and p2.

Figure 1B:
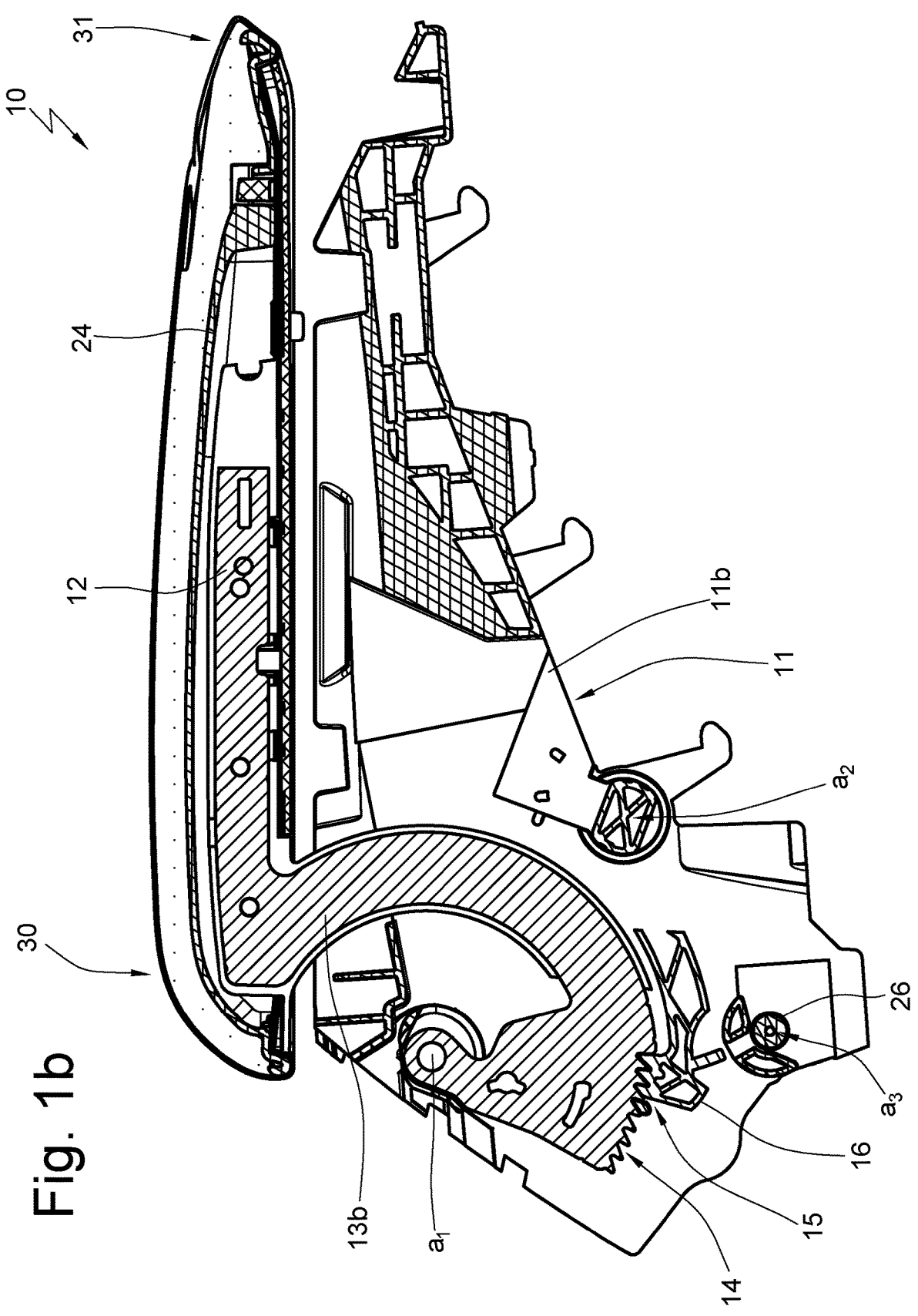
FIG. 1b is a sectional view of the equipment device according to section line B-B in FIG. 2.
Figure 2:
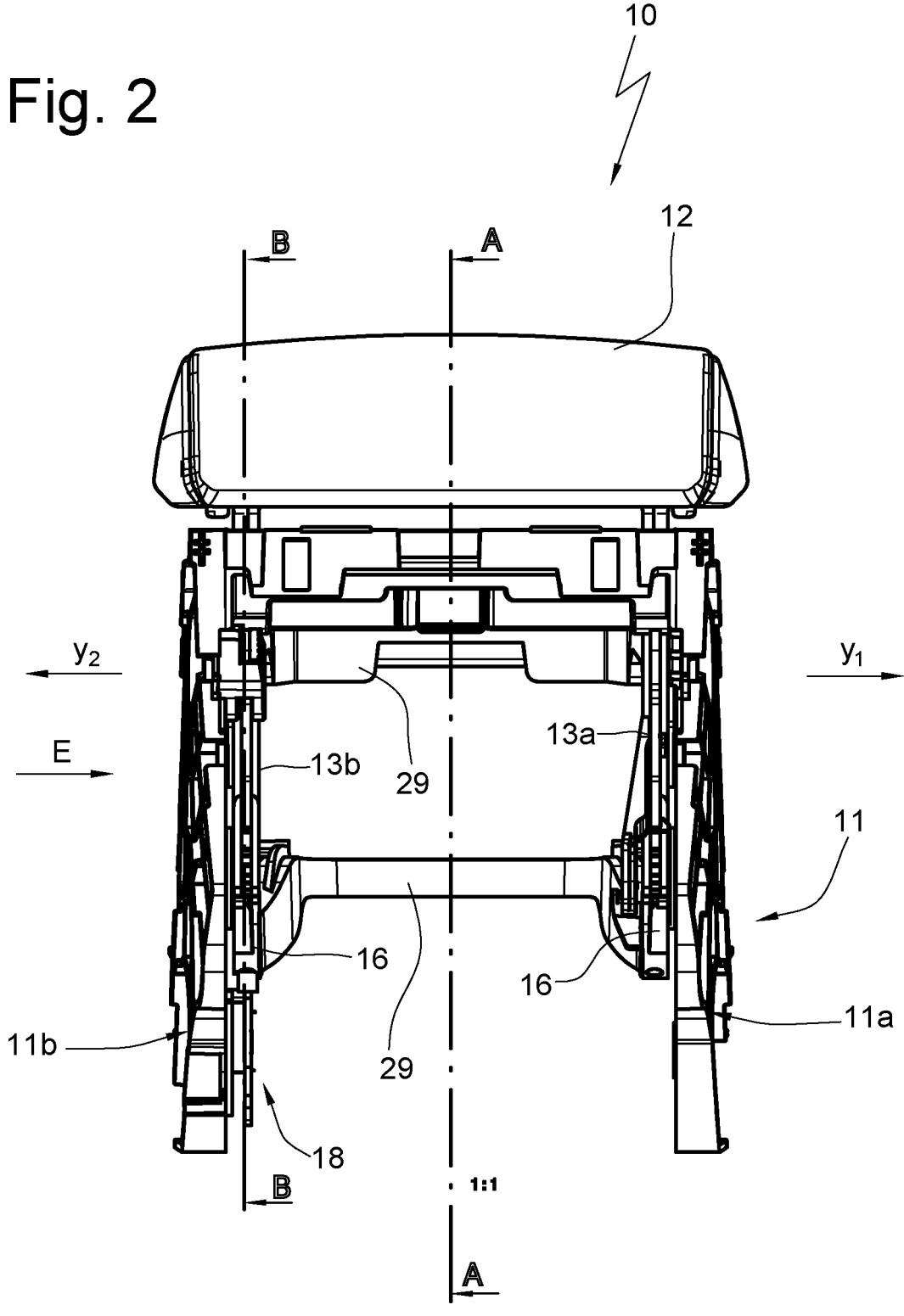
FIG. 2 is a rear view of the armrest according to view arrow C in FIG. 1.
Figure 3:
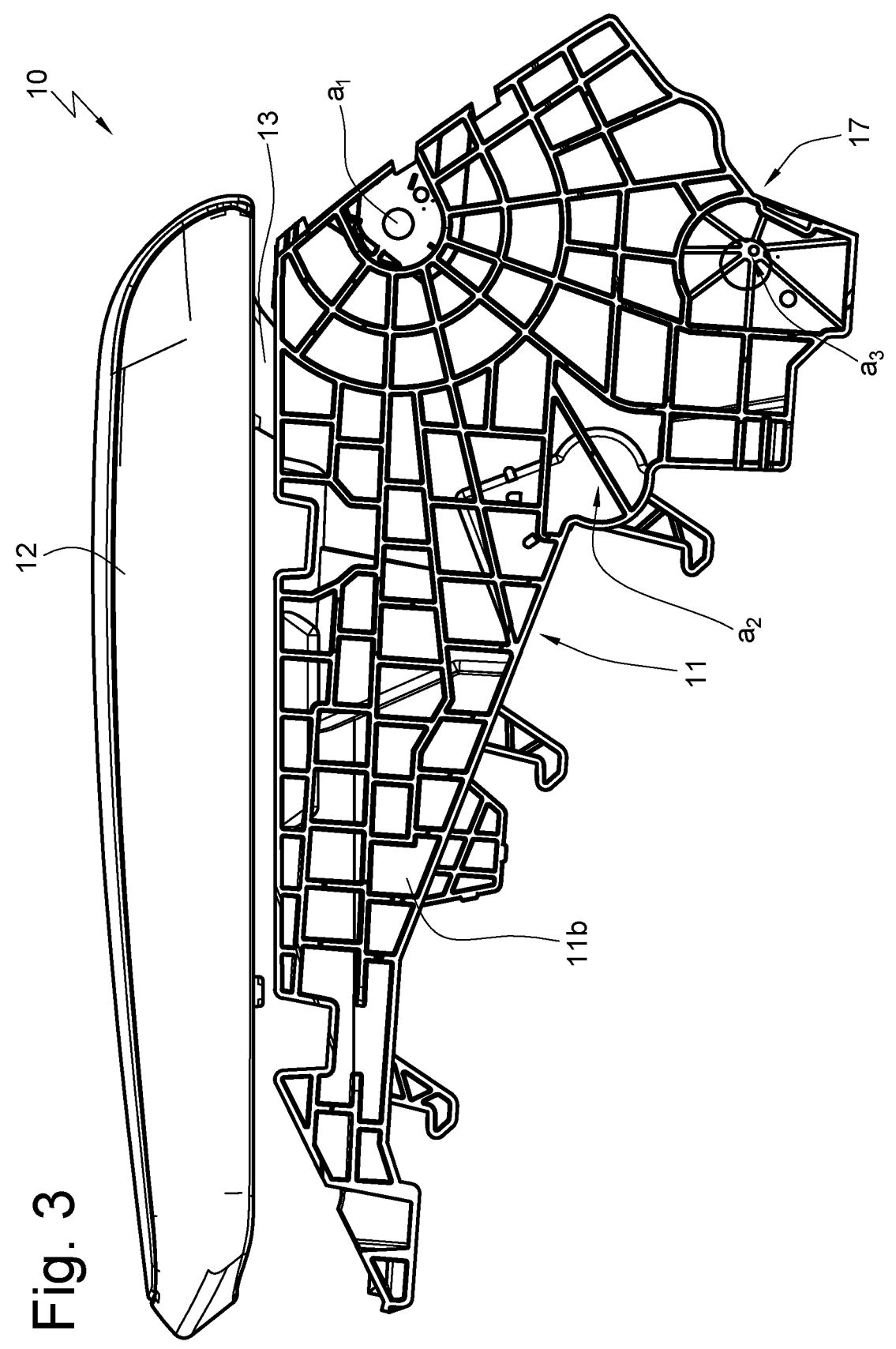
FIG. 3 is a view according to view arrow E in FIG. 2.

In the sectional view of FIG. 1*b*, the return element 26—here in the form of a double-leg spring—can be seen. Owing to the location of the section, the blocking surface 28 is not visible in FIG. 1*b*.

In a rest position of the blocking device 18, the opening 22 is arranged in such a manner that the engagement means 23, which is fixedly connected to the latch 16, is able to move into the opening 22 when the latch 16 moves into the release position. In the present example, the blocking device 18 is loaded into the rest position by at least one return means 26 (not shown), in this example by a spring, in particular a double-leg spring or a torsion spring.

When a defined acceleration of positive or negative type acts on the inertia element 19, as is the case in the event of rear-end collisions with the generation of force components in one of the directions x1 or x2, the inertia element 19 moves from the rest position into a blocking position. In the blocking position, the inertia element 19 is arranged in such a manner that the engagement means 23 is in the immediate vicinity of a blocking surface 28 of the wall 21. When the latch 16 moves in the direction of the release position, a stop surface 29 of the engagement means 23 abuts the blocking surface 28 and the latch 16 is unable to move from the latching position into the release position. This has the result that the pivot part 12 is also unable to move from the set position and injure an occupant.

Figure 4:
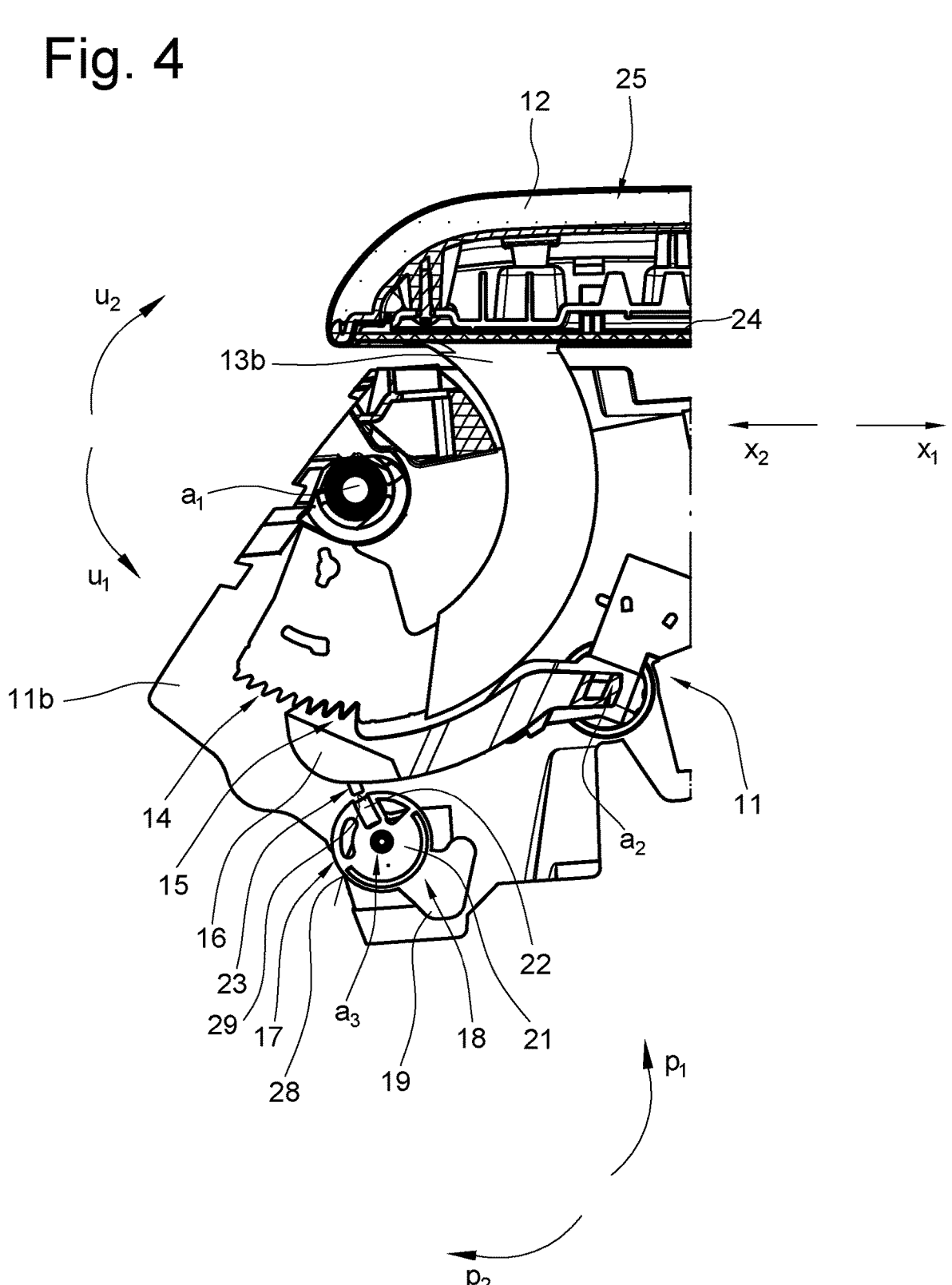
FIG. 4 is a detail according to detail line D in FIG. 1.

As can be seen in FIG. 4, the wall 21 in this exemplary embodiment is in the form of a circular disc, and the blocking surface 28 is formed by a face of the wall which, apart from the region of the opening 22, makes up the entire circumference. In other words, the blocking surface 28 covers all theoretically possible pivot positions of the inertia element 19 about the pivot axis a3, apart from the region of the opening 22, and therefore prevents the latch 16 from moving into the release position over the entire pivot range of approximately 360°.

Therefore, no configuration is possible in which the inertia element, as a result of an acceleration, is deflected against the spring force of the return means 26 to such an extent that the blocking surface 28 is overcome and the latch 16 is able to move into the release position again, as is the case in the mentioned prior art.

Figure 5:
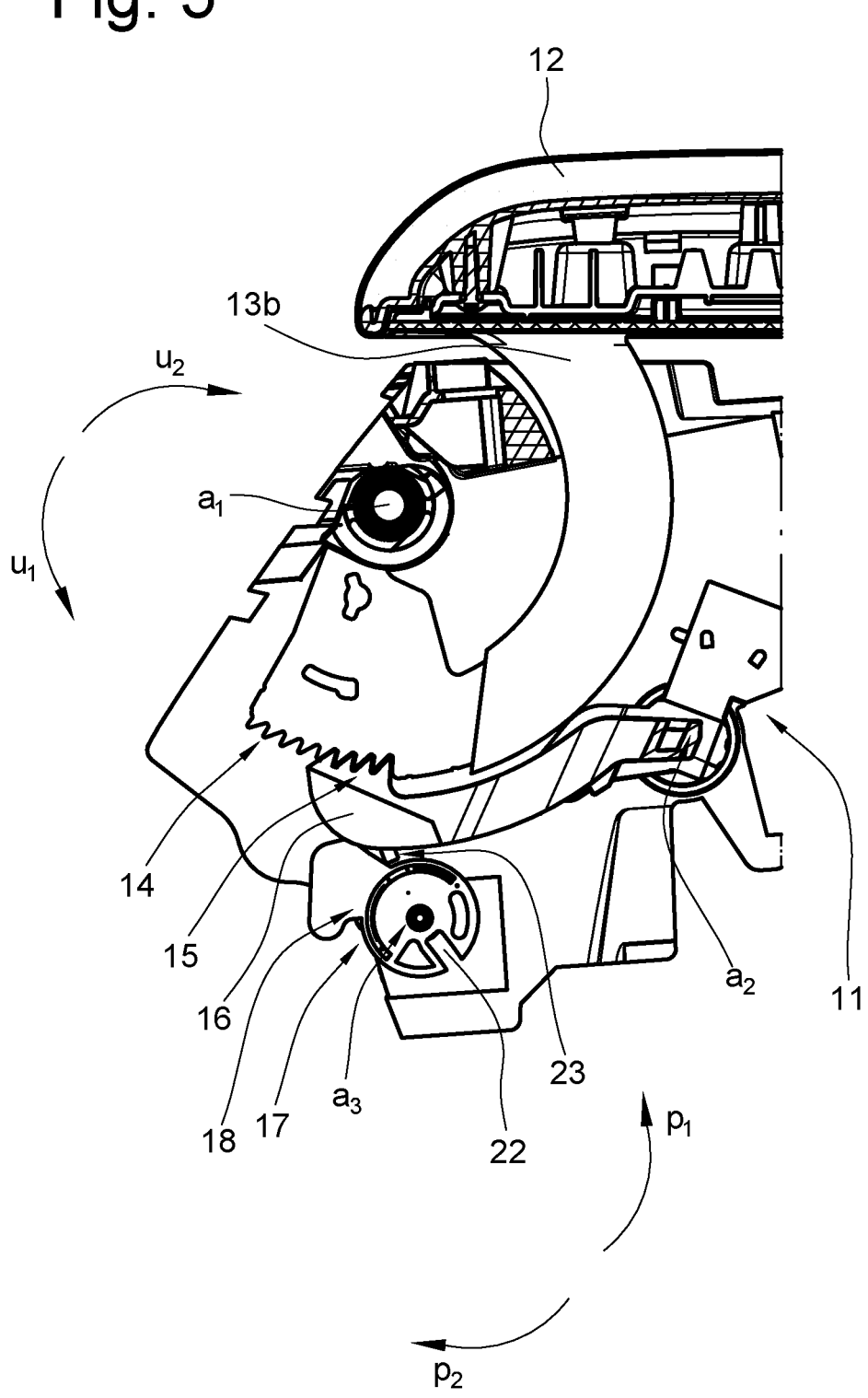
FIG. 5 shows the detail according to FIG. 4, wherein the blocking device has been moved into a blocking position in the case of positive acceleration.

In FIG. 5, the inertia element 19 has been pivoted from the rest position in direction p2 into the position shown according to FIG. 5 by a positive acceleration of the vehicle in direction x1. It can be seen that the prolongation 23 is arranged directly adjacent to the blocking surface 28, and the latch 16 is therefore unable to move from the latching position into the release position.

Figure 6:
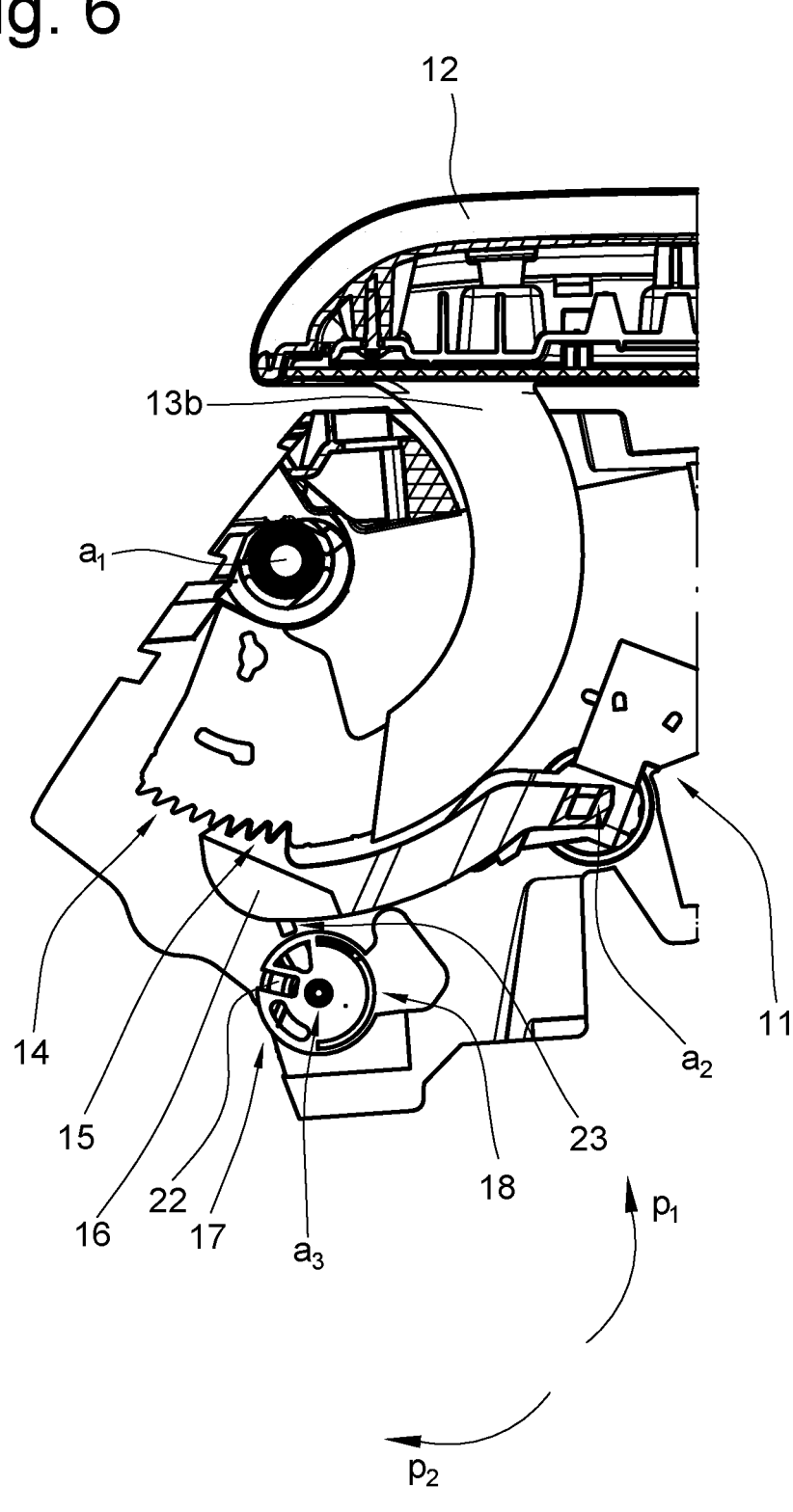
FIG. 6 shows the detail according to FIG. 4, wherein the blocking device has been moved into a blocking position in the case of negative acceleration.

FIG. 6 shows a situation in which, as a result of a negative acceleration, that is to say a deceleration of the vehicle in direction x2, the inertia element 19 has been pivoted from the rest position in direction p1. In this case too, the prolongation 23 is adjacent to the blocking surface 28, so that a movement into the release position is not possible.

Figure 7:
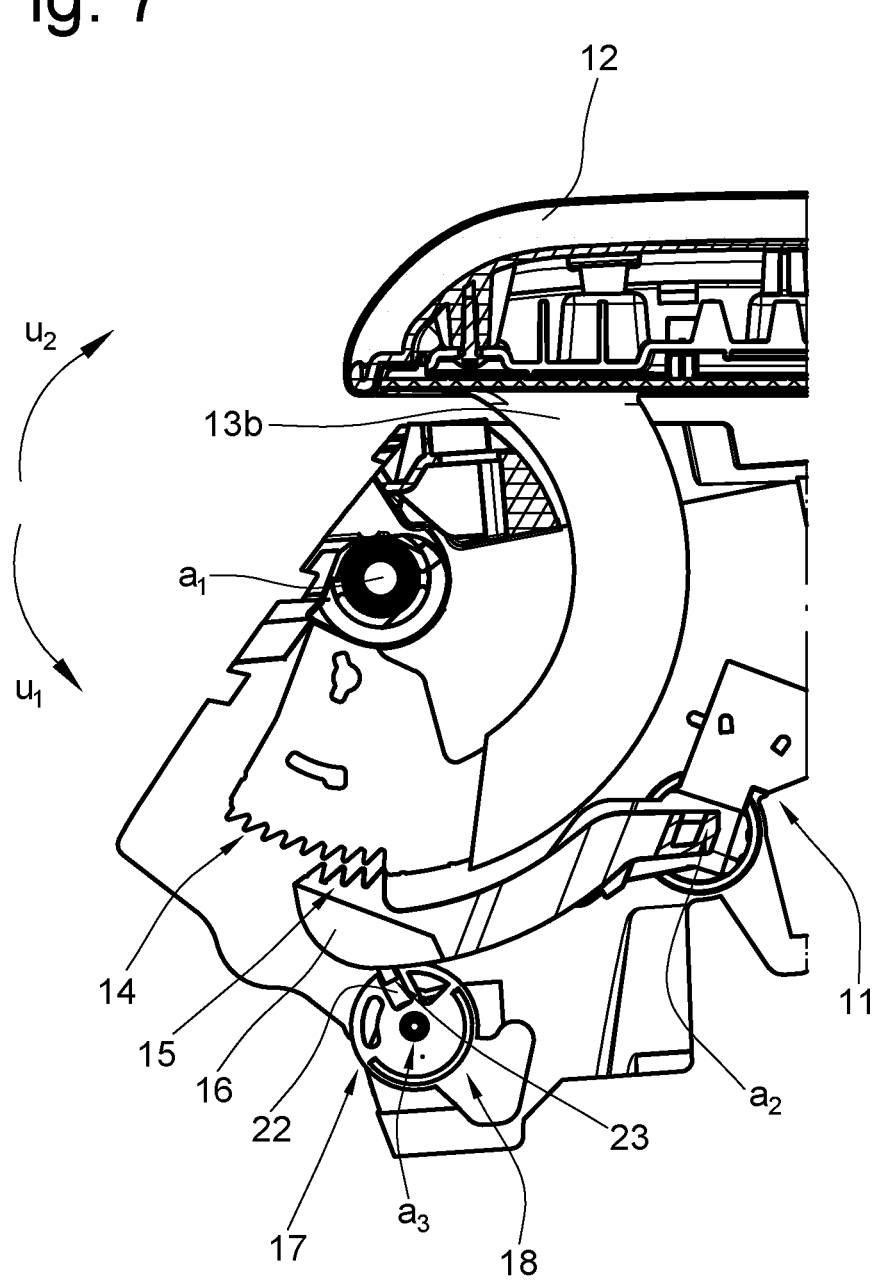
FIG. 7 shows the detail according to FIG. 4, wherein the latch is arranged in the release position and the blocking device is arranged in the rest position.

If the acceleration has ended and the vehicle is stationary or is being moved at a constant speed, the return means 26 causes the inertia element 19 to move back into the rest position according to FIG. 4. In the rest position, the latch 16 can be moved according to FIG. 7 into the release position, wherein the prolongation 23 moves into the opening 22. The latch 16 is movable into the release position manually by the user of the equipment device 10 by an actuator (not shown) and is loaded into the latching position by a return device (likewise not shown), for example a spring.

Figure 8:
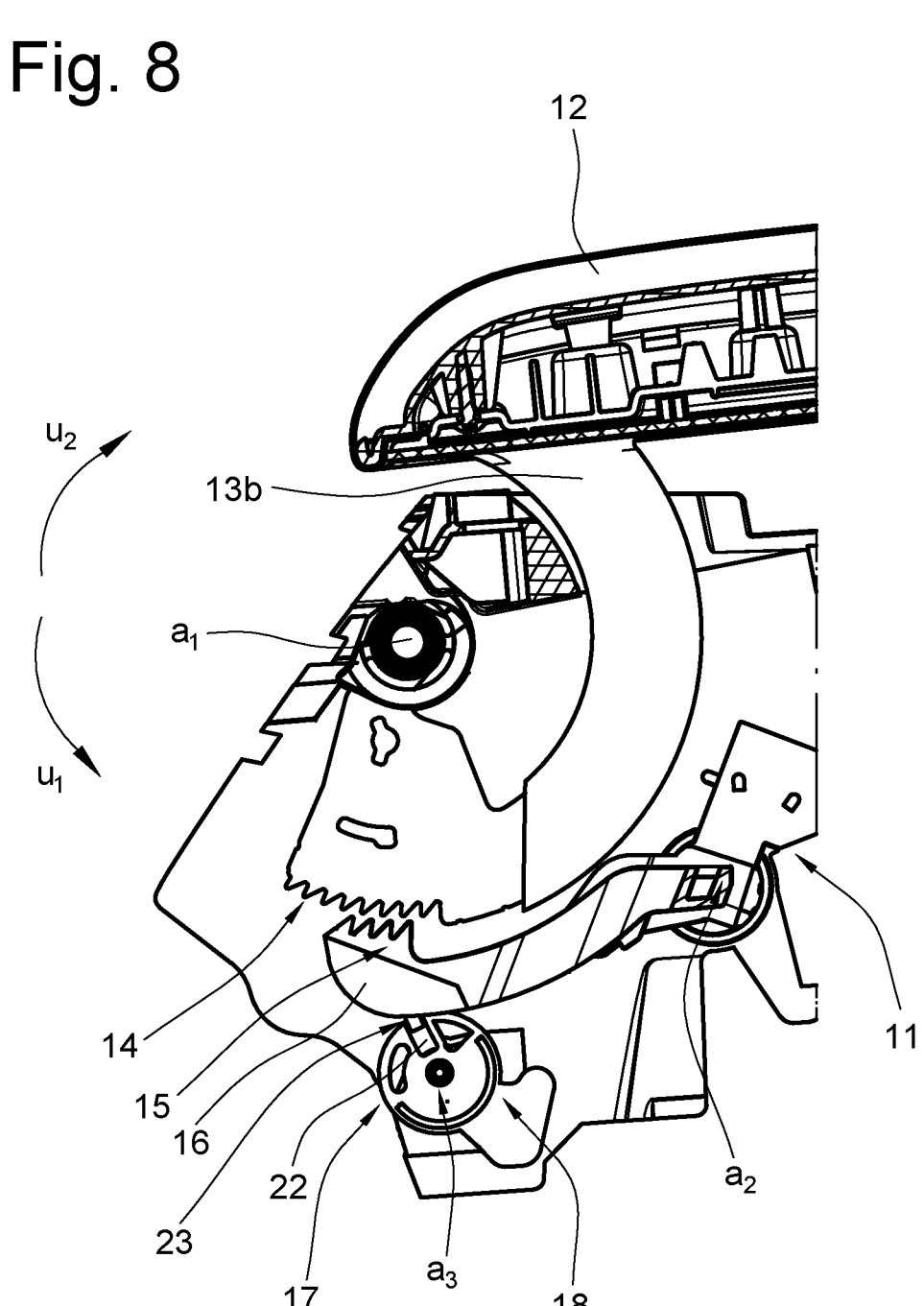
FIG. 8 shows the armrest in accordance with FIG. 7, wherein the armrest has been moved with respect to FIG. 7.

In the release position of the latch 16, a pivot movement of the pivot part 12 in direction u1 or u2 is possible. According to FIG. 8, the pivot part 12 has been pivoted in direction u1, wherein the latch 16 is in the release position and the prolongation 23 has been received in the opening 22.

Figure 9:
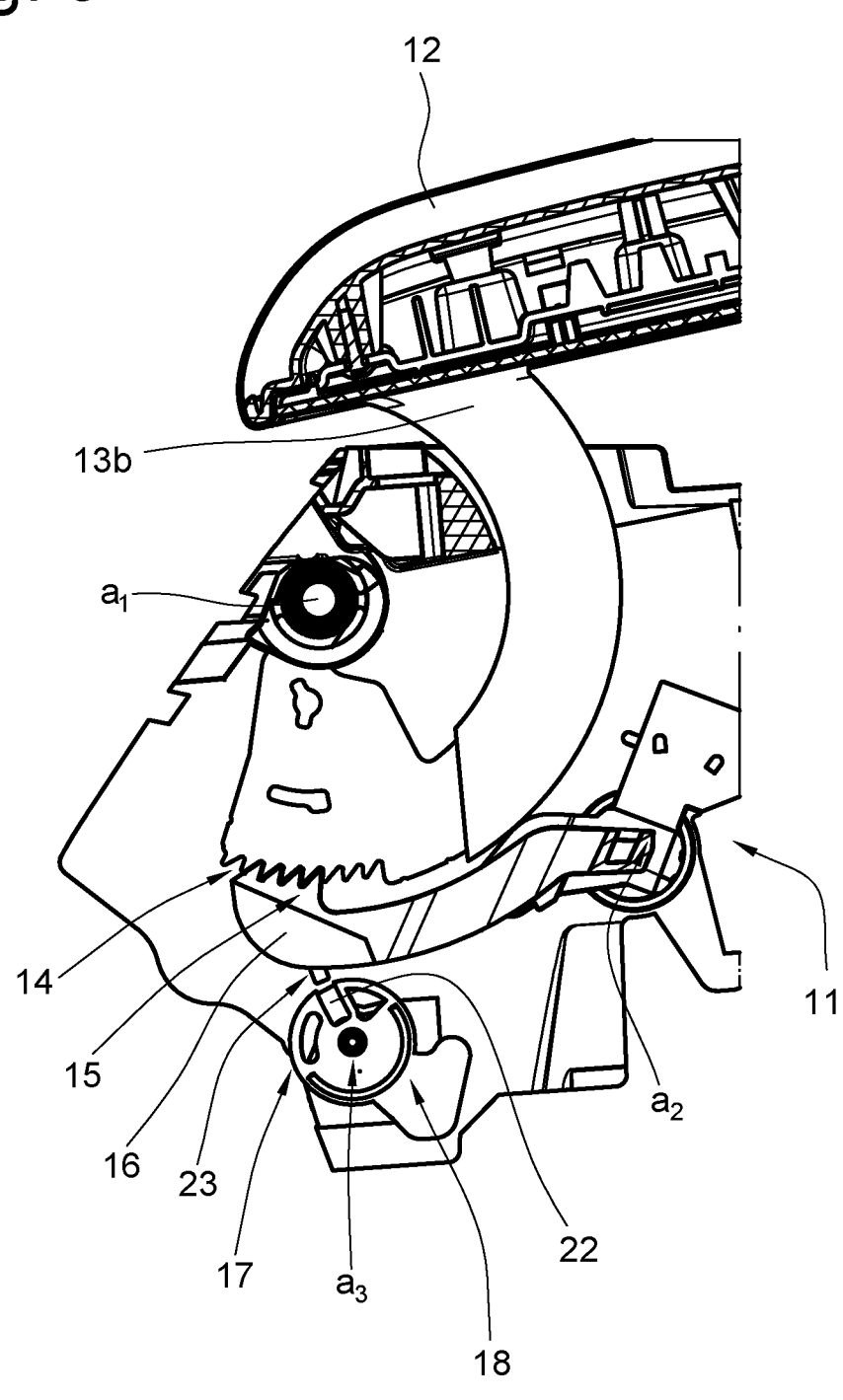
FIG. 9 shows the armrest in accordance with FIG. 8, wherein the latch is in the latching position.
Figure 10:
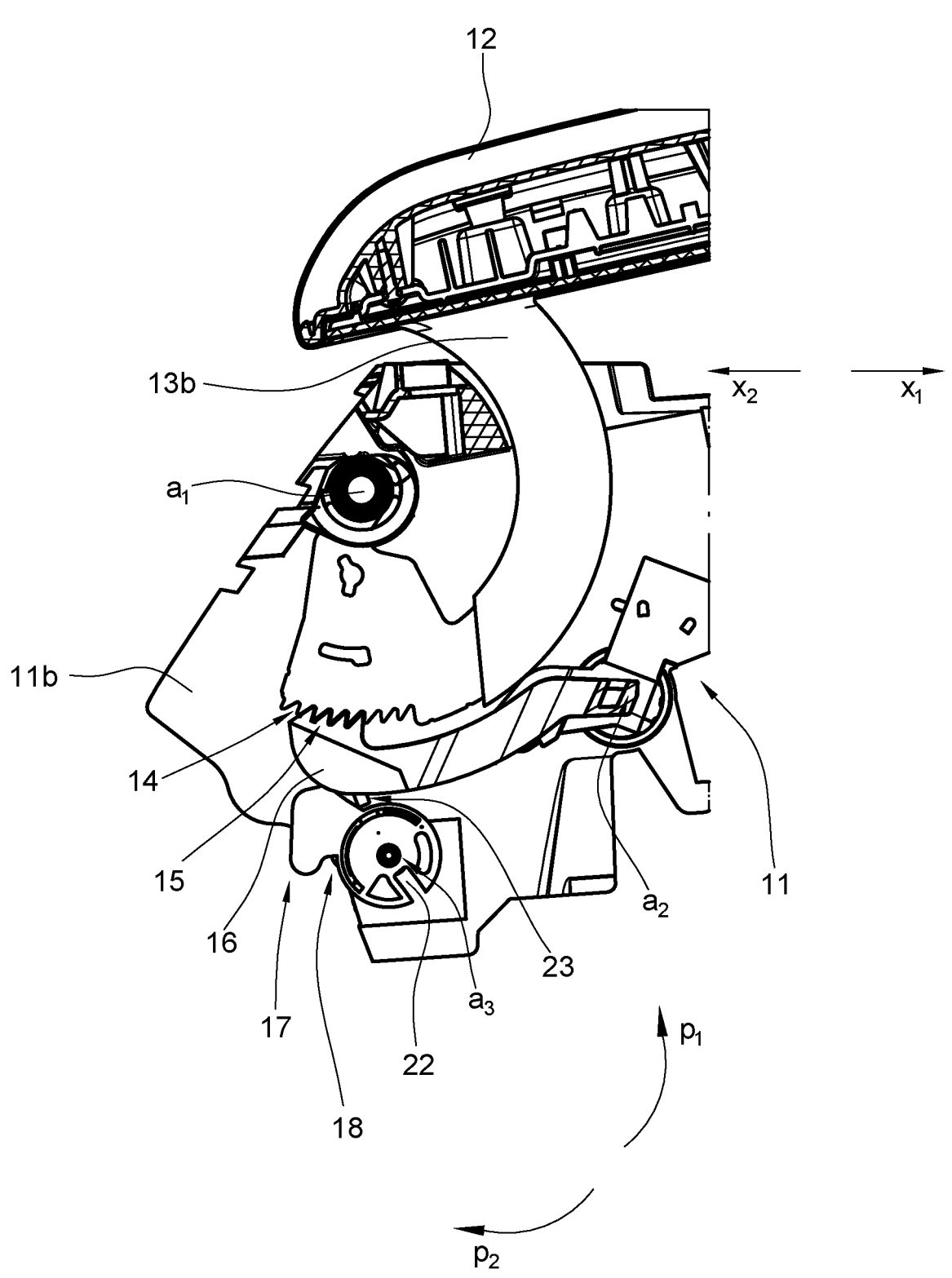
FIG. 10 shows the armrest in accordance with FIG. 9, wherein the blocking device has been moved into a blocking position in the case of positive acceleration.

According to FIG. 9, the latch 16 has moved into the latching position again. The pivot part 12 is now in a different position to the position according to FIG. 4. In this position of the pivot part 12 too, the blocking device 18 is pivoted in the case of a positive acceleration (see FIG. 10) and in the case of a negative acceleration (not shown), so that the blocking surface 28 prevents the latch 16 from moving into the release position.

The blocking device 18 is also effective in the case of cooperating stop means 14 and 15 in the form of a directional locking mechanism. This is because, in the case of a directional locking mechanism too, the latch must move from the latching position into the release position in order that an adjustment of the pivot part 12 can take place in one direction.

In this exemplary embodiment, the inertia element 19 is mounted only by means of a pivot axis a3. According to an alternative embodiment, the inertia element 19 could also be pivotable about two pivot axes which are arranged rotated relative to one another by 90°, for example, in order to take greater account of forces acting transverse to the direction of travel x1 and x2. A wall 21 would then form a plane parallel to directions x1 and x2, for example, and an additional wall would form a plane parallel to directions y1 and y2, which forms a 90° angle with the wall 21. The inertia element 19 is mounted by means of a cardan joint, for example. In this case, the wall would likewise have to have a circular blocking surface, which is formed transverse to the blocking surface 28.

The mounting of the inertia element 19 can also be configured as a ball joint. A pivot movement of the inertia element 19 is then possible in all pivot directions. In this case or in the case of the mounting of the inertia element 19 with two axes rotated relative to one another, the blocking surface can be configured as a sphere and can be connected in terms of movement to the inertia element.

The invention claimed is:

1. An equipment device for an interior of a vehicle, comprising: a base; a pivot part pivotably mounted on the base so as to be pivotable relative to the base between a first position and a second position, the pivot part being lockable in at least one pivot position; a locking device for locking the pivot part, the locking device including first stop means associated with the pivot part, the first stop means being in engagement in a latching position with second stop means associated with the base and out of engagement with the second stop means in a release position; and a movable latch having a safety device that prevents the locking device from moving into the release position in case of a positive or negative vehicle acceleration, wherein the first stop means or the second stop means are associated with the movable latch, wherein the safety device comprises a blocking device having an inertia element that is pivotable about at least one pivot axis and is connected in terms of movement to a wall having a blocking surface, wherein, in a rest position of the blocking device, the latch is movable into the release position and, in a blocking position, movement of the latch is prevented by virtue of a collision of the latch with the blocking surface, wherein the blocking surface extends over a pivot angle of between 270° and 360°.

2. The equipment device according to claim 1, wherein the latch has an engagement means and the wall has an opening.

3. The equipment device according to claim 2, wherein the opening extends radially from a face of the wall in the direction of the pivot axis.

4. The equipment device according to claim 1, wherein the latch is movable in a pivotably or translationally movable manner between the latching position and the release position.

5. The equipment device according to claim 1, wherein the latch has the second stop means and is associated with the base and the first stop means are fixedly held on the pivot part, or the latch has the first stop means and is associated with the pivot part, and the second stop means are fixedly associated with the base.

6. The equipment device according to claim 1, further comprising at least one arm connected to the pivot part, wherein the first stop means are formed on the at least one arm.

7. The equipment device according to claim 1, wherein the locking device is configured to lock the pivot part in at least two use positions.

8. The equipment device according to claim 1, wherein the inertia element is formed in one piece with the wall.

9. The equipment device according to claim 1, wherein the inertia element is a one-armed lever.

10. The equipment device according to claim 1, wherein the wall is a circular disc.

11. The equipment device according to claim 10, wherein the blocking surface is formed on a face of the circular disc.

12. The equipment device according to claim 1, further comprising an actuating device or a controller operative to adjust the latch between the latching position and the release position in dependence on a position of the pivot part.

13. The equipment device according to claim 1, wherein the blocking device is loaded into the rest position by gravity.

14. The equipment device according to claim 1, further comprising at least one return element that loads the blocking device into the rest position.

15. The equipment device according to claim 1, wherein the inertia element is mounted so as to be pivotable about the at least one pivot axis or so as to be pivotable via a ball joint.

16. The equipment device according to claim 1, further comprising delay means for delaying an accidental movement of the blocking device from the blocking position back into the rest position or retaining means for preventing an accidental movement of the blocking device from the blocking position back into the rest position.

17. The equipment device according to claim 1, wherein the equipment device is an armrest of a vehicle seat and the pivot part forms an arm support that is pivotable relative to the base.

* * * * *